2,908,654

METHOD OF PREPARING A HYDROGENATION-DEHYDROGENATION CATALYST

Heinz Heinemann, Swarthmore, and Harold Shalit, Drexel Hill, Pa., assignors to Houdry Process Corporation, Wilmington, Del., a corporation of Delaware No Drawing. Application July 13, 1955
Serial No. 521,907

4 Claims. (Cl. 252—441)

This invention relates to dehydrogenation catalysts characterized by the presence of from 0.2 to 1.9% platinum on gamma alumina.

Platinum has long been recognized as a highly effective hydrogenation catalyst. Gamma alumina has long been recognized as having certain advantages as a dehydration catalyst, and/or as a slightly acidic catalyst, and/or as a catalyst carrier. Because of the peculiar adsorptive characteristics of gamma alumina, traces of stabilizers, promotors, modifiers and/or impurities such as sodium oxide, silica, magnesia, beryllia, and halides, have greatly affected the characteristics of catalysts containing gamma alumina, particularly at elevated temperatures. Efforts have been made to deposit diamino dinitro platinum on activated alumina particles for the preparation of hydrogenation catalysts, but the resulting catalysts while relatively free of acid have ordinarily possessed less hydrogenation activity for a given platinum content than reforming catalysts prepared by impregnation from chloroplatinic acid solutions. The latter catalysts, however, have marked activity for acid catalyzed reactions due to the presence of chloride in addition to the hydrogenation-dehydrogenation activity of the platinum function. Treatment of a chloride-containing reforming catalyst with mixtures of air and steam or 100% steam decreases its acid activity, but also seriously impairs its hydrogenation activity. Carriers such as activated carbon, magnesia or silica have ordinarily been utilized as carriers for platinum when a non-acidic, single functional catalyst was desired.

Heretofore, dual functional catalysts having a controlled amount of acidity and also having a dehydrogenation function, have been prepared containing alumina, a halide, and platinum. Such dual functional catalysts have been widely used in the aromatizing of organic compounds and/or the reforming of gasoline. Such catalysts have generally contained more than 0.1% halide, and have been sufficiently acidic that they have tended to promote polymerization of olefins at low temperatures. Accordingly, such catalysts have been unsatisfactory for a variety of chemical reactions of industrial importance.

Prior to the development of the modern reforming catalyst, various materials containing relatively large amounts of platinum, such as compositions containing from 5 to 50% platinum were utilized as hydrogenation catalysts. Because platinum is such an expensive material, such high platinum catalysts could not commercially compete with catalysts employing nickel or other less expensive hydrogenation components. For many years, the modern reforming catalysts were considered to be uniquely useful for aromatizing and/or reforming conditions, and other uses for catalysts containing less than 2% platinum on gamma alumina were not widely industrialized.

In the development of the present invention, it was found that the attrition resistance of single function hydrogenation catalyst could be increased to a considerable degree similarly to the development of high resistance to attrition in a reforming (dual function) catalyst. Moreover, it was established that particularly advantageous catalysts resulted from the preparation of non-acidic, single function platinum on gamma alumina particles from activated alumina particles having an attrition index greater than 60. As examples of the preparation of attrition resistant activated alumina particles, reference is made to the application of E. B. Cornelius and T. H. Milliken, Jr., entitled Method of Preparing Attrition Resistant Alumina Particles, Serial No. 477,596, filed December 24, 1954, now abandoned, and the application of E. B. Cornelius, T. H. Milliken, Jr., and G. A. Mills entitled Extruding Attrition Resistant Alumina Particles, Serial No. 510,868, filed May 24, 1955, now U.S. Patent 2,809,170. Activated alumina particles of uniform large size can be subjected to a standard ball mill (one inch stainless steel balls in a thick walled stainless steel cylindrical can rotating at 80 r.p.m.) for an hour, the attrition index corresponding to the percentage of recovery of the alumina as large size particles. Particles having an attrition index greater than 60 are recoverable as large particles to an extent greater than 60% after said one hour standard ball mill attrition test.

A gas stream, such as a hydrogen stream, can readily desorb hydrogen chloride from an inert surface, such as silicon carbide, quartz, or the like. The peculiarity of gamma alumina, whereby small amounts of hydrogen halide are securely bound thereto in a form such as not to be readily desorbed by a hydrogen stream, has heretofore been established by reforming catalyst authorities. It has not been feasible to employ corundum (sometimes called alpha alumina) as a carrier for highly active reforming catalyst, and in order to distinguish from corundum, catalyst carrier grades are designated by terms such as activated alumina, sorptive alumina or gamma alumina.

In accordance with the present invention dual function catalyst particles characterized by metallic platinum on halide-containing alumina are treated with a mixture of a reducing gas (e.g. hydrogen) and steam to form a substantially single function hydrogenation-dehydrogenation catalyst characterized by platinum on alumina, and containing less than 0.1% halide.

Catalyst particles comprising alumina, metallic platinum, and a significant amount (more than 0.1%) of halide can be prepared by a variety of procedures. In some embodiments such dual function catalyst particles are prepared such as by forming gamma alumina particles having a surface area of about 60 to 100 square meters per gram, and impregnating said activated gamma alumina particles with an aqueous solution of chloroplatinic acid, or depositing colloidal platinum sulfide in hydrolyzed aluminum chloride or chlorided alumina, and subjecting the impregnated particles to a reducing treatment with hydrogen.

Catalyst particles (platinum on halide-containing alumina, regardless of how prepared) are subjected to a reducing atmosphere containing from about 25 mol percent to 75 mol percent steam, and from 10 mol percent to 75 mol percent of a reducing gas, such as hydrogen, and, if desired or required, the balance of a suitable inert gas, such as nitrogen, methane, ethane or mixtures thereof, at a temperature between 700 and 1000° F. for from about 1 to about 36 hours to form particles characterized by the presence of less than 0.1% chloride, and from 0.2 to 1.9% platinum, and consisting of more than 98% gamma alumina. In one preferred embodiment of the invention, the activated gamma alumina particles have an attrition index greater than 60 and a surface area range from 60 to 100 meters per gram.

Reference is made to several examples illustrating the chemistry of the methods and materials pertinent to the present invention.

PREPARATION OF CATALYST A

Commercially available activated alumina particles having an attrition index of about 16 were subjected to leaching with 10% acetic acid at room temperature for one hour, and then rinsed with distilled water. Thus the alkali metal content and miscellaneous impurity content of the activated alumina were substantially reduced without leaching much of the alumina from the particles. An aqueous solution of chloroplatinic acid was sprayed onto the tumbling alumina particles, care being taken to avoid the presence of metallic iron or other acid soluble material. The thus impregnated pellets were dried at about 275° F. for sixty minutes and were then in suitable condition for marketing as a dual function catalyst. In a conventional start-up of a reforming apparatus, a heated hydrogen-rich gas stream is circulated to raise the reformer to operating temperature, simultaneously transforming the chloroplatinate to metallic platinum. A special reduction treatment was conducted in lieu of such start-up of a reforming unit. The catalyst particles, after the chloroplatinate impregnation and drying steps were subjected to a hydrogen stream at 900° F for 30 minutes to convert the chloroplatinate to metallic platinum. A substantial proportion of the chloride remained in securely bond form. There is ambiguous and conflicting evidence concerning the exact chemical nature of the chloride in a chloride-containing dual function platinum on alumina catalyst. Possibly, the chloride is in some way combined with the platinum and/or the alumina, but whatever the chemical structure, it is convenient to describe such catalysts as platinum on chlorided alumina catalysts.

The catalyst particles prepared in this manner contained 0.5% platinum, 0.5% chloride, and 99% gamma alumina. The catalyst particles were rod-shaped, about 4 mm. long, and about 4 mm. diameter. They were excellent reforming catalyst particles, and were effective in upgrading a high boiling range virgin gasoline about forty octane numbers when a mixture of about 8 mols of hydrogen and one mol of said gasoline was passed through a reforming zone at 600 p.s.i. and 950° F. at a space rate of 2 liquid volumes of charge per volume of catalyst per hour (LHSV), and were in most other respects substantially identical to the superior grades of regularly marketed chloride-containing platinum on alumina dual function catalyst particles, and much better than other kinds of industrially available chloride-containing platinum on alumina dual function catalysts. These superior catalyst particles performed well in the di-isobutylene test, and converted about 75% of the cyclohexane to benzene in the standard dehydrogenation test; both of which tests are described hereinafter.

PREPARATION OF CATALYST B

Following the procedure of the application of E. B. Cornelius, T. H. Milliken, Jr., and G. A. Mills entitled Extruding Attrition Resistant Alumina Particles, Serial No. 510,868, filed May 24, 1955, alumina particles are prepared in such a manner as to have an attrition index of 80, a diameter of about 4 mm. and a length of about 4 mm. These particles are placed in a rubber lined pill-coating mixer and are sprayed with a solution of chloroplatinic acid to impregnate the equivalent of 0.5% platinum on the surface of the pellets, and are subjected to an air stream at about 275° F. for sixty minutes to remove excess moisture. The dried particles impregnated with chloroplatinate are treated with hydrogen at about 900° F. for one hour to convert the chloroplatinate to metallic platinum, thereby forming catalyst particles suitable for use in reforming of hydrocarbons. Upon exposure to air, the platinum may be converted in part to oxides of platinum, but the metallic platinum condition is readily restored at elevated temperature by exposure to a reducing atmosphere such as hydrogen.

Chloride-containing dual function platinum on alumina particles prepared in this manner possess outstanding attrition resistance, having an attrition index of about 70. Such catalysts contain about 0.5% platinum and about 0.5% chloride and are effective in converting paraffinic gasoline to high octane aromatic gasoline by treatment at 850–1000° F. in the presence of about 6–10 mols of hydrogen per mol of gasoline and at 200–600 p.s.i.

The hydrogenation-dehydrogenation function of a catalyst may be measured by dehydrogenation of cyclohexane to benzene at selected and controlled conditions. By determining the benzene content (e.g. by refractive index) of the liquid effluent from a catalyst zone subjected to a mixture of one mol of pure cyclohexane and 4 mols of hydrogen at a liquid space rate of 6, at atmospheric pressure, and at an accurately measured temperature within the range from 600° F. to 700° F., the results being calculated as if the temperature were precisely 650° F., the hydrogenation-dehydrogenation activity of the catalyst is measured. The high space rate and other conditions are such that the conversion is less than the equilibrium value.

A hydrogenation catalyst of outstanding effectiveness, when tested by the cyclohexane test, provides benzene contents of about 70 to 85%. If the cyclohexane test results indicate benzene contents such as 55%, the catalyst is very much more effective as a hydrogenation catalyst than many commercially used hydrogenation catalysts. The advantage of the cyclohexane tests resides in its ability to detect slight deficiencies in catalyst characteristics which might otherwise be discovered only by prolonged industrial use.

The acid function of good dual function catalysts may be tested by subjecting the catalyst at 800° F. at atmospheric pressure to a stream of di-isobutylene at a LHSV of 7.5 and measuring the weight of debutanized liquid products. A good reforming catalyst selectively cracks about 65–70% of the di-isobutylene, permitting the recovery of liquid (about 98% pure di-isobutylene) representing 35–30% of the test sample.

The previously described attrition resistant dual function platinum on alumina particles convert about 75% of the cyclohexane to benzene in the standard dehydrogenation test and crack about 68% of the di-isobutylene in the test for the acid activity. Because catalyst particles prepared in this manner increase the octane number of gasoline several points more than the gain in octane numbers in using some dual function reforming catalysts available on the market, the effectiveness of the attrition resistant catalyst for both dehydrogenation and isomerization was established without reference to the separate tests.

*Example I*

Following the described procedure, granules of catalyst A were prepared and then treated with a mixture consisting of about 67% steam and 33% hydrogen at 900° F. for 5 hours. This treatment was sufficient to reduce the chloride content to less than 0.1%. The dehydrogenation function was not impaired by the steam treatment, as evidenced by the transformation of 74% of the cyclohexane to benzene during the standard cyclohexane test on the dehalided catalyst.

*Example II*

Granules of catalyst A were employed in a gasoline reforming unit until it became somewhat coked. Thereafter, the coked catalyst was subjected to a treatment with 67% steam and 33% hydrogen at atmospheric pressure at 900° F. for five hours, whereby its chloride content was reduced from about 0.5% to 0.09%. The dechlorided catalyst was regenerated by burning the coke with diluted air and was then found to have excellent dehydrogenation effectiveness as evidenced by a cyclohexane test result of 69.4% benzene.

Example III

Granules of catalyst B are subjected to a dehaliding treatment for 5 hours at 900° F. in a mixture of 67 mol percent steam and 33 mol percent hydrogen. The dehalided catalyst particles contain about 0.04% chloride and about 0.5% platinum. Thus the halide content is less than 1/10 the platinum content. Moreover such halide content is significantly below 0.1% halide. The surface area of the dechlorided catalyst is about 80 square meters per gram. The catalyst particles are substantially free from acid activity, as demonstrated in a di-isobutylene test, but are highly effective as dehydrogenation catalysts, as indicated by a 76 index in the cyclohexane test. The dechlorided attrition resistant particles are especially advantageous hydrogenation-dehydrogenation catalysts for a great variety of reactions.

Example IV

Attrition resistant particles of catalyst B are dechlorided by treatment with a mixture of 25 mol percent steam, 70 mol percent ethane, and 5 mol percent hydrogen at a temperature of 1000° F. for a period of seven hours to reduce the chloride content to about 0.05% and to form a highly effective single function hydrogenation catalyst.

Example V

Platinum reforming catalyst particles of catalyst A are dechlorided by treatment with an equimolar mixture of steam, methane, hydrogen and propane at a temperature of 700° F. for 10 hours to produce a non-acidic catalyst having a 75 index in the cyclohexane test.

Example VI

Catalyst particles of catalyst A are transformed into highly effective single function dehydrogenation catalyst particles by treatment with a mixture consisting of 15 mol percent nitrogen, 75 mol percent steam, and 10 mol percent hydrogen at 750° F. for a period of six hours at a pressure of two atmospheres.

Example VII

Attrition resistant reforming catalyst particles of catalyst B are dechlorided by treatment with 75 mol percent steam and 25 mol percent hydrogen at 900° F. at ten atmospheres pressure in one hour to form catalysts producing about 75% benzene in the cyclohexane test.

In contrast with the operative examples are the data for the preparations of inoperative catalysts. Consistently poor results were obtained in preparing catalysts by steam treatment of dual function catalysts A and B in the absence of a reducing gas. By sufficiently prolonged and/or severe treatment, the chloride content could be reduced below 0.1%, but the resulting catalysts were relatively poor dehydrogenation catalysts, forming from about 10% to about 40% benzene in the cyclohexane test. Varying conditions similarly to Examples I through VII but omitting the reducing gas established that satisfactory dehydrogenation catalysts could be prepared only if a reducing gas was present in a concentration of at least 5% during the steam dechlorination of the platinum reforming catalyst.

Example VIII

The effectiveness of single function dehydrogenation catalysts prepared in accordance with the present invention was established in a series of experiments. Virgin naphtha and gasoline from a cracking unit formed a mixed naphtha, comprising olefins of the gasoline boiling range and organic sulfur compounds. This gasoline was passed through an experimental guard case to test the effectiveness of simultaneous hydrodesulfurization and olefin saturation reactions. Reaction conditions included a hydrogen to gasoline mol ratio of 1.5 at a pressure of 300 p.s.i.g. at 700° F. at a space rate of 6. The charge stock had a bromine number of 60.8, indicative of the presence of a significant amount of olefins, and 0.6% sulfur. Samples of single function catalyst prepared in accordance with Example I were compared with a cobalt molybdate on alumina catalyst under the aforesaid conditions. Each catalyst removed about 80% of the sulfur under the test conditions, but the catalyst of the present invention was more effective in the simultaneous hydrogenation of the olefins and thus in the reduction of the bromine number of the effluent. The cobalt molybdate reduced the bromine number from 60.8 to 27.3, whereas the platinum on alumina catalyst resulting from Example I reduced the bromine number from 60.8 to 6.0. Under the same conditions the reforming catalyst of catalyst A was of intermediae effectiveness in olefin hydrogenation; had marked poorer stability of activity for sulfur removal; and had the further disadvantage of cracking more of the gasoline, thus increasing the butane and light gas formation, and lowering the yield of liquid product recovery.

Obviously many modifications and variations of the invention as hereinbefore set forth may be made without departing from the spirit and scope thereof, and therefore only such limitations should be imposed as are indicated in the appended claims.

What is claimed is:

1. The method of preparing a non-acidic single function hydrogenation catalyst comprising the steps of preparing sorptive high area alumina particles having minimum dimensions of from 2 to 13 mm.; impregnating such sorptive alumina particles with an aqueous solution of chloroplatinic acid to deposit compounds corresponding to from 0.2 to 1.9% platinum; treating the impregnated particles with hydrogen to form platinum, the particles thus containing a weight concentration of chloride of about the same magnitude as the weight concentration of platinum; and thereafter treating the particles with an oxygen-free gaseous mixture comprising about 25% to 75% by volume steam and about 10% to 75% by volume hydrogen and the balance consisting of up to 65% by volume of steam for a period from about 1 to about 36 hours at a temperature within the range of from 700° F. to 1000° F. to reduce the chloride content of the particles from above 0.1% to significantly below 0.1%, whereby there are formed non-acidic, single function hydrogenation catalyst particles capable of converting at least 60% of cyclohexane to benzene at 650° F. at a liquid space rate of 6, at atmospheric pressure and at a hydrogen to cyclohexane ratio of 4.

2. In the method of manufacture of platinum on alumina catalyst particles, in which sorptive alumina particles having minimum dimensions of from 2 to 13 mm. are impregnated with chloroplatinic acid and subjected to hydrogen to form platinum on chloride-containing alumina particles, the improvement which consists of subjecting the platinum on chloride-containing alumina particles to an atmosphere containing from about 25% to about 75% by volume steam and from about 10% to about 75% by volume hydrogen and up to 65% by volume of gas selected from the group consisting of methane, ethane and propane for a period from about 1 to about 36 hours at a temperature within the range of from 700° F. to 1000° F. to reduce the chloride content of the particles from above 0.1% to significantly below 0.1%, whereby there are formed non-acidic, single function hydrogenation catalyst particles capable of converting at least 60% of cyclohexane to benzene at 650° F. at a liquid space rate of 6, at atmospheric pressure and at a hydrogen to cyclohexane ratio of 4.

3. The method of preparing a substantially non-acidic single function hydrogenation catalyst from alumina particles containing from 0.2 to 1.9% metallic platinum and a halide content of about the same magnitude as the weight concentration of platinum comprising, treating such particles with an oxygen-free gaseous mixture comprising about 25% to 75% by volume steam, about 10% to 75% by volume hydrogen and up to about 65% by volume of inert gas for a period from about 1 to about 36 hours at a temperature within the range of from 700° F. to 1000° F. to reduce the chloride content of the particles from above 0.1% to significantly below 0.1%, whereby there are formed non-acidic, single function hydrogenation catalyst particles capable of converting at least 60% of cyclohexane to benzene at 650° F. at a liquid space rate of 6, at atmospheric pressure and at a hydrogen to cyclohexane ratio of 4.

4. The method of preparing substantially non-acidic single function hydrogenation-dehydrogenation catalyst from reforming catalyst consisting essentially of a major amount of activated alumina and minor amounts of metallic platinum and halide, such method comprising decreasing the halide content of said catalyst to significantly below 0.1% by weight of the final catalyst to prepare non-acidic single function hydrogenation-dehydrogenation catalyst capable of converting at least 60% of cyclohexane to benzene at 650° F. at a liquid space rate of 6, at atmospheric pressure and at a hydrogen to cyclohexane ratio of 4, said decreasing of the halide content comprising treating such a reforming catalyst in a gaseous atmosphere consisting essentially of steam and hydrogen and in the absence of oxidizing gas at conditions including pressure of atmospheric to 10 atmospheres, temperature of 700° F. to 1000° F. and time of at least one hour.

References Cited in the file of this patent

UNITED STATES PATENTS

| | | |
|---|---|---|
| 2,422,172 | Smith et al. | June 10, 1947 |
| 2,566,521 | Haensel | Sept. 4, 1951 |
| 2,642,383 | Berger et al. | June 16, 1953 |
| 2,662,860 | Engel et al. | Dec. 15, 1953 |
| 2,662,861 | Ribblett et al. | Dec. 15, 1953 |
| 2,723,947 | Oblad et al. | Nov. 15, 1955 |
| 2,746,937 | Hunter et al. | May 22, 1956 |
| 2,759,897 | Haensel et al. | Aug. 21, 1956 |